United States Patent
Fye et al.

(10) Patent No.: US 11,790,860 B2
(45) Date of Patent: Oct. 17, 2023

(54) SYSTEMS AND METHODS FOR PROVIDING IMAGE MOTION ARTIFACT CORRECTION FOR A COLOR SEQUENTIAL (CS) DISPLAY

(71) Applicant: HONEYWELL INTERNATIONAL INC., Charlotte, NC (US)

(72) Inventors: James Fye, Phoenix, AZ (US); John Suddreth, Phoenix, AZ (US); Kenneth Leiphon, Phoenix, AZ (US); Sean Caufield, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 88 days.

(21) Appl. No.: 17/466,677

(22) Filed: Sep. 3, 2021

(65) Prior Publication Data

US 2023/0074306 A1    Mar. 9, 2023

(51) Int. Cl.
*G09G 3/34* (2006.01)
*B60K 35/00* (2006.01)
(Continued)

(52) U.S. Cl.
CPC .......... *G09G 3/3413* (2013.01); *B60K 35/00* (2013.01); *G06F 3/012* (2013.01); *G09G 3/007* (2013.01);
(Continued)

(58) Field of Classification Search
CPC .... G09G 3/3413; G09G 3/007; G09G 3/2003; G09G 2310/0235; G09G 2310/08;
(Continued)

(56) References Cited

U.S. PATENT DOCUMENTS

| 5,684,498 A | 11/1997 | Welch et al. |
| 7,486,730 B2 | 2/2009 | Van Dijk et al. |

(Continued)

FOREIGN PATENT DOCUMENTS

WO    9720244 A1    6/1997

OTHER PUBLICATIONS

Johnson, P. V., Kim, J., & Banks, M. S. (2014). The visibility of color breakup and a means to reduce it. Journal of Vision,14(14):10, 1-13, http://www.journalofvision.org/content/14/14/10, doi:10.1167/14.14.10.

*Primary Examiner* — Douglas M Wilson
(74) *Attorney, Agent, or Firm* — Lorenz & Kopf LLP

(57) ABSTRACT

Systems and methods for providing image motion artifact correction for a color sequential (CS) display in a display system in a vehicle. The system includes a processor operationally coupled to a source of a coherent RGB image frame, a source of a line of sight (LOS) motion rate, and the display system, the processor configured to, calculate a sub-frame (SF) timing rate for the CS display; unpack the coherent RGB image frame into a Red, a Green, and a Blue frame; calculate a red, a green, and a blue pixel shift, as a function of a LOS rate change; apply the red pixel shift to the Red frame, the green pixel shift to the Green frame, and the blue pixel shift to the Blue frame, thereby creating modified RGB sub-frames; and re-packing the modified RGB sub-frames into a modified coherent RGB image frame for the CS display.

12 Claims, 2 Drawing Sheets

Figure 1:
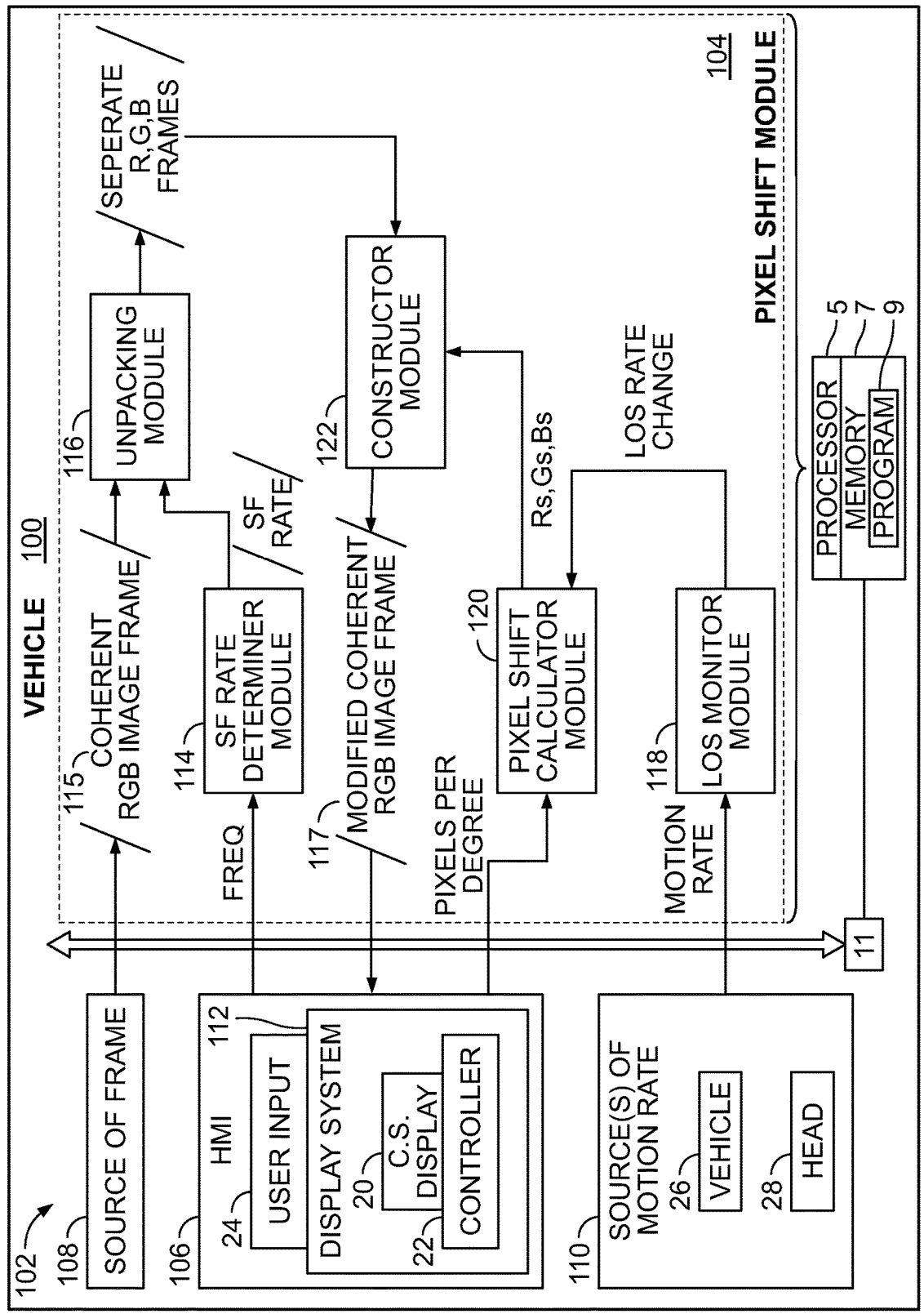

(51) Int. Cl.
*G06F 3/01* (2006.01)
*G09G 3/00* (2006.01)
*G02B 27/01* (2006.01)
*G09G 3/20* (2006.01)

(52) U.S. Cl.
CPC .... *B60K 2370/12* (2019.05); *B60K 2370/152* (2019.05); *G02B 27/017* (2013.01); *G09G 3/2003* (2013.01); *G09G 2310/0235* (2013.01); *G09G 2310/08* (2013.01); *G09G 2320/0242* (2013.01); *G09G 2320/0261* (2013.01); *G09G 2380/10* (2013.01)

(58) Field of Classification Search
CPC ... G09G 2320/0242; G09G 2320/0261; G09G 2380/10; B60K 35/00; B60K 2370/12; B60K 2370/152; G06F 3/012; G02B 27/017
See application file for complete search history.

(56) References Cited

U.S. PATENT DOCUMENTS

| | | | |
|---|---|---|---|
| 8,179,401 B2 | 5/2012 | Ishii | |
| 8,970,495 B1* | 3/2015 | Biffle | G09G 3/003 345/158 |
| 2011/0255013 A1 | 10/2011 | Selbrede et al. | |
| 2016/0131912 A1 | 5/2016 | Border et al. | |
| 2017/0206668 A1* | 7/2017 | Poulos | G06V 20/00 |

* cited by examiner

SYSTEMS AND METHODS FOR PROVIDING IMAGE MOTION ARTIFACT CORRECTION FOR A COLOR SEQUENTIAL (CS) DISPLAY

TECHNICAL FIELD

The following disclosure generally relates to vehicle display systems. More particularly, the following disclosure relates to systems and methods for providing image motion artifact correction for a color sequential (CS) display in a vehicle.

BACKGROUND

Generally, the two primary display types used in augmented reality (AR), virtual reality (VR) and mixed reality (MR) applications are Color Filter (CF) displays and Color Sequential (CS) displays. However, for applications involving line of sight (LOS) tracking or head tracking, the CS displays can exhibit color breakup motion artifacts in their images, a phenomenon known as rainbowing.

As a solution to the problem of rainbowing, many available vehicle display systems use CF displays, because they don't exhibit the rainbowing response to scene direction changes that the CS displays respond with. However, the CF displays introduce the technical problems of operating with much slower frame rates than CS displays, and of exhibiting a much higher latency. The higher latency of the CF display results in an undesirable effect that is referred to as a retina blur in head-tracked applications.

Accordingly, improved display systems and methods that can timely and accurately respond to scene direction changes in LOS tracking or head tracking applications are desirable. Furthermore, other desirable features and characteristics of the disclosure will become apparent from the subsequent detailed description and the appended claims, taken in conjunction with the accompanying drawings, brief summary, technical field, and this background of the disclosure.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a processor-implemented method for providing image motion artifact correction for a color sequential (CS) display in a display system in a vehicle, the method comprising: receiving a coherent red green blue (RGB) image frame for the CS display; calculating a sub-frame timing rate as a function of a CS display frequency of the CS display; unpacking the coherent RGB image frame into a red frame, a green frame, and a blue frame, based on the sub-frame timing rate; monitoring a Line of Sight (LOS) motion rate generated by a source of the LOS motion rate; determining a line of sight (LOS) rate change as a function of the LOS motion rate; calculate a red pixel shift, a green pixel shift, and a blue pixel shift, collectively referred to as sub-frame pixel shifts, wherein each of the sub-frame pixel shifts is a function of the LOS rate change, the sub-frame timing rate, and a pixels per degree of the CS display; constructing modified RGB sub-frames, by applying the red pixel shift to the red frame, the green pixel shift to the green frame, and the blue pixel shift to the blue frame; and re-packing the modified RGB sub-frames into a modified coherent RGB image frame for the CS display, thereby providing the image motion artifact correction.

Also provided is a system providing image motion artifact correction for a color sequential (CS) display in a display system in a vehicle, the system comprising: a source of a coherent red green blue (RGB) image frame for the CS display; a source of a Line of Sight (LOS) motion rate; a processor operationally coupled to the source of the coherent RGB image frame, the source of the motion rate, and the display system, the processor configured by programming instructions to, receive the coherent RGB image frame; calculate a sub-frame (SF) timing rate for the CS display; unpack the coherent RGB image frame into a Red (R) frame, Green (G) frame, and a Blue (B) frame, based on the SF timing rate; monitor the LOS motion rate; determine a LOS rate change as a function of the LOS motion rate; calculate a red pixel shift, a green pixel shift, and a blue pixel shift, collectively referred to as sub-frame pixel shifts, wherein each of the sub-frame pixel shifts is a function of the LOS rate change, the SF timing rate, and a pixels per degree of the CS display; construct modified RGB sub-frames, by applying the red pixel shift to the Red frame, the green pixel shift to the Green frame, and the blue pixel shift to the Blue frame; and re-packing the modified RGB sub-frames into a modified coherent RGB image frame for the CS display, thereby providing the image motion artifact correction.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWING FIGURES

Figure 2:
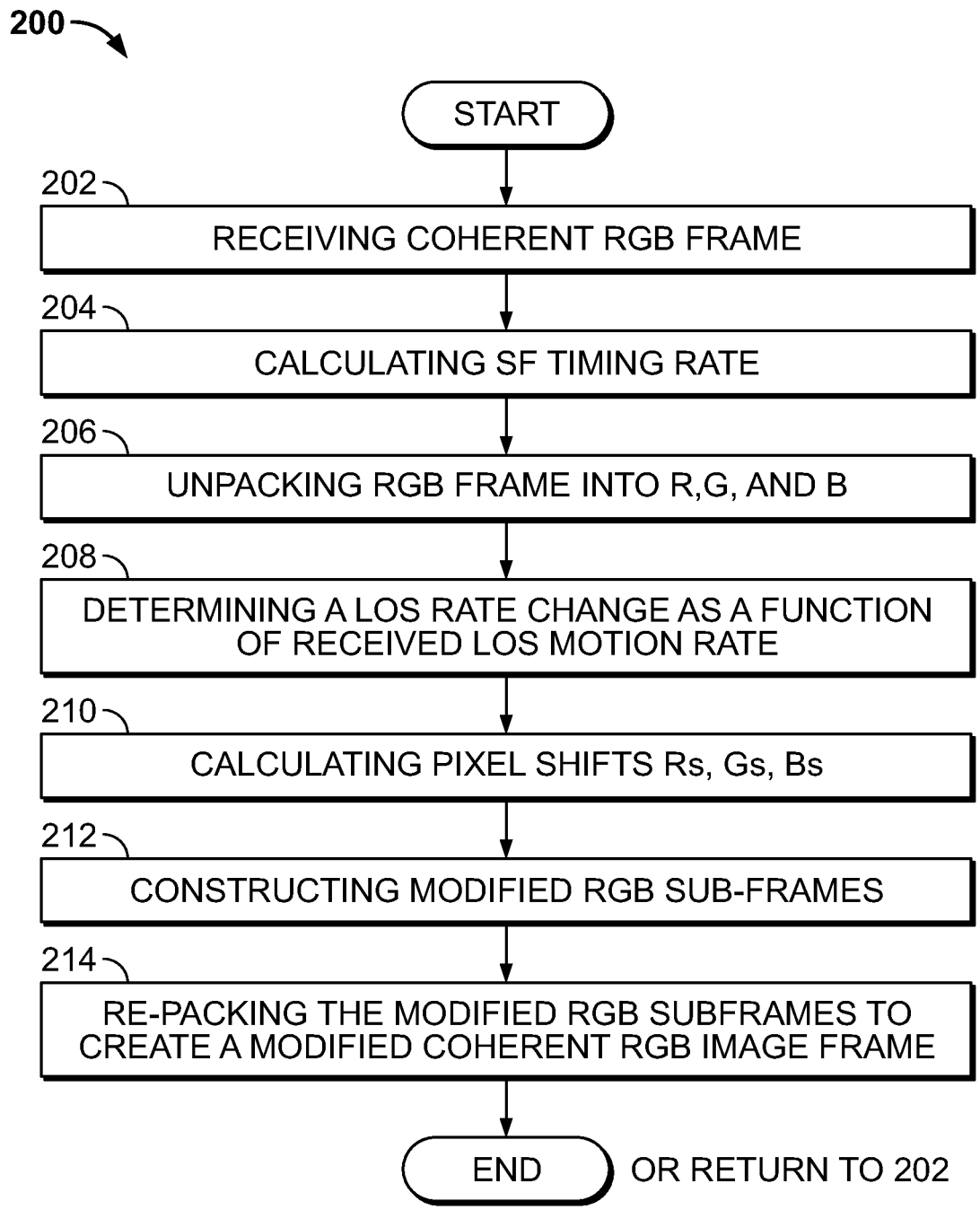

At least one example of the present invention will hereinafter be described in conjunction with the following figures, wherein like numerals denote like elements, and:

FIG. 1 shows a functional block diagram of a vehicle including a system for providing image motion artifact correction for a color sequential (CS) display in a display system, in accordance with exemplary embodiments of the present disclosure; and FIG. 2 is a flowchart illustrating a method for providing image motion artifact correction for a color sequential (CS) display, in accordance with exemplary embodiments of the present disclosure.

DETAILED DESCRIPTION

The following detailed description is merely exemplary in nature and is not intended to limit the invention or the application and uses of the invention. As used herein, the word "exemplary" means "serving as an example, instance, or illustration." Thus, any weather or flight display system or method embodiment described herein as "exemplary" is not necessarily to be construed as preferred or advantageous over other embodiments. All the embodiments described herein are exemplary embodiments provided to enable persons skilled in the art to make or use the invention and not to limit the scope of the invention which is defined by the claims.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, programmable logic arrays, application specific integrated circuits, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

As mentioned, there are two primary display types used in augmented reality (AR), virtual reality (VR) and mixed reality (MR) applications, Color Filter (CF) displays and Color Sequential (CS) displays. However, the CS displays introduce technical problems when used in applications involving line of sight (LOS) tracking or head tracking, because they don't handle scene direction changes well, and exhibit color breakup motion artifacts in their images, a phenomenon known as rainbowing. Many available display systems use CF displays as a solution to rainbowing, because they don't exhibit the rainbowing response to scene direction changes that the CS displays respond with. However, the CF displays introduce the technical problems of operating with much slower frame rates than CS displays, and of exhibiting a much higher latency. The higher latency of the CF display results in an undesirable effect that is referred to as a retina blur in head-tracked applications.

A technical solution to the above described technical problems is disclosed herein, in the form of systems and methods for providing image motion artifact correction for a color sequential (CS) display, for use in a vehicle. CS displays are desirable over CF displays due to their higher brightness, operability at much higher frame rates than CF displays can operate, and lower latency needed to minimize retina blur. Therefore, CS displays can be superior for the earlier described LOS tracking or head tracking applications that experience scene direction changes. CS displays are also particularly desirable for their ability to maximize image crispness and readability during high vehicle and head motion scenarios. Embodiments provide a novel technical solution that effectively eliminates the image motion artifact in a CS display, enabling the use of the CS display for the AR, VR, and MR applications.

FIG. 1 is a block diagram of a system for providing image motion artifact correction for a color sequential (CS) display in a display system in a vehicle (shortened herein to "system" 102), in accordance with an exemplary and non-limiting embodiment of the present disclosure. The system 102 may be utilized onboard a mobile platform to provide calibration of displayed synthetic images, as described herein. In various embodiments, the mobile platform is a vehicle 100, which carries or is equipped with the system 102. Vehicle 100 may be any type of vehicle, for travel on land or in the air. As such, vehicle 100 may be any type of airplane (regardless of size or propulsion means, ranging from large, turbine-powered commercial airplanes to small, electrically-powered drones), rotorcraft (helicopter, gyrocopter), lighter-than-air vessel (hot-air balloon, blimp), or glider, for example. Vehicle 100 may be "manned" in the conventional sense that the flight crew is present within the vehicle 100, or it may be manned remotely.

As schematically depicted in FIG. 1, system 102 includes the following components or subsystems, each of which may assume the form of a single device or multiple interconnected devices: a pixel shift module 104 operationally coupled to: a HMI 106 (human-machine interface); a source of a frame 108; and, one or more sources of motion rate 110. In various embodiments, the pixel shift module 104 communicates with the other components of the system 102 via a communication circuit 11 and bus.

The human-machine interface, HMI 106, may include a display system 112 and a user input device 24. In various embodiments, the HMI 106 includes at least one instance of an integration of the user input device 24 and a display device 20 (e.g., a touch screen display). In various embodiments, the HMI 106 may include a user input device 24 such as, any combination of a keyboard, cursor control device, voice input device, gesture input apparatus, or the like.

The display system 112 is configured to receive and process information from various vehicle systems and databases (for example, position determining systems), to utilize the Display controller 22 for display processing and graphics processing, and to drive the display device 20 to render features in one or more avionic displays. The term "avionic display" is defined as synonymous with the term "aircraft-related display" and "cockpit display" and encompasses displays generated in textual, graphical, cartographical, and other formats. In various embodiments, the avionic display is a primary flight display (PFD) or a navigation display. In various embodiments, the avionic display can be, or include, any of various types of lateral displays and vertical situation displays on which map views and symbology, text annunciations, and other graphics pertaining to flight planning are presented for a pilot to view. The avionic display generated and controlled by the system 102 can include graphical user interface (GUI) objects and alphanumerical input displays of the type commonly presented on the screens of MCDUs, as well as Control Display Units (CDUs) generally. Specifically, embodiments of avionic displays may include one or more two dimensional (2D) avionic displays, such as a horizontal (i.e., lateral) navigation display or vertical navigation display; and/or on one or more three dimensional (3D) avionic displays, such as a Primary Flight Display (PFD) or an exocentric 3D avionic display.

Generally, the display device 20 is configured to include any number and type of image generating devices on which one or more avionic displays may be produced. With respect to the present invention, the display device 20 is at least a CS display device. The CS display 20 device operates with a display frequency and can be characterized by a first number of pixels per degree in the horizontal direction and a second number of pixels per degree in the vertical direction. The first number and the second number may be the same or different. The display device 20 may further embody a touch screen display. When the system 102 is utilized for a manned aircraft, display device 20 may be affixed to the static structure of the Aircraft cockpit as, for example, the aforementioned Head Up Display (HUD) unit, or a Head Down Display (HDD). Alternatively, display device 20 may assume the form of a movable display device (e.g., a pilot-worn display device) or a portable display device, such as an Electronic Flight Bag (EFB), a laptop, or a tablet computer carried into the Aircraft cockpit by a pilot.

Within the display system, the display controller 22 has a preprogrammed display sub-frame timing and sequentially renders RGB sub-frames, according to this programmed display sub-frame timing (also referred to as SF timing). The display sub-frame timing may be static or dynamic. In an embodiment, the display sub-frame timing comprises a reference time for a first color, a second color offset time for a second color, and a third color offset time for a third color (these may be referred to as display sub-frame times and SF times). In an example embodiment, the reference time is time zero, the second color offset time is X milliseconds, the third color offset time is Y milliseconds. The first color, the second color, and the third color together comprise a combination of red, green, and blue (RGB), and the order of them may be swapped around. In some embodiments, the display sub-frame times can vary based on configurable brightness setting. In other words, the display controller 22 may detect the brightness setting and then vary a display sub-frame time (the length of time for a color to be displayed) to accommodate the brightness setting. In other embodiments, instead of providing offset times, three reference times are provided, e.g., a first reference time, a second reference time, and a third reference time, wherein the first, second, and third reference times are associated with a combination of RGB. Additionally, in dim settings, the Display controller 22 may detect the dim setting and shorten the display sub-frame times.

The source of frame 108 generates and provides an initial coherent RGB image frame. Non-limiting examples of the source of frame 108 include a camera and synthetically generated terrain based on a database. The initial coherent RGB frame is a real-time image frame depicting features surrounding the vehicle 100, and the display controller 22 is programmed to adjust the image rendered on the CS display to indicate a present position and location of the vehicle 100. In some embodiments, the source of frame 108 includes a camera and associated circuitry, and the initial coherent RGB frame is then a camera image frame. In various embodiments, output from the source of frame 108 additionally includes a frame rate. In some embodiments, the initial coherent RGB image frame is a synthetic image frame.

One or more source(s) of motion rate 110 provide a line of sight (LOS) motion rate to the pixel shift module 104. In various embodiments, the LOS motion rate is a head motion rate or a vehicle motion rate. In some embodiments, the LOS motion rate is a head motion rate, received from an IMU on a user's head 28. In some embodiments, the LOS motion rate is a vehicle motion rate, received from an inertial motion unit (IMU) on a vehicle 26. In some embodiments, the vehicle motion rate is determined as a function of data from a camera in a known fixed position on the vehicle 100 and a vehicle IMU.

It should be appreciated that vehicle 100 includes many more additional features (systems, databases, etc.) than the illustrated systems 102-110, and that may each communicate via the communications circuit 11 and bus. For purposes of simplicity of illustration and discussion, however, the illustrated vehicle 100 omits these additional features.

The pixel shift module 104 performs image motion artifact correction on an initial coherent RGB frame, as explained hereinbelow. Specifically, when the pixel shift module 104 operates on an initial coherent RGB image frame for a CS display, the pixel shift module 104 converts the initial coherent RGB image frame 115 into a modified coherent RGB image frame 117, in which the respective RGB sub-frames displayed by the CS display are coherent and aligned—on the eye retina—even in the presence of the temporal shifting of the RGB sub-frames introduced via the sequential nature of the CS display 20.

The term "module," as appearing herein, broadly encompasses those components utilized to carry-out or otherwise support the processing functionalities of the system 102. Accordingly, in various embodiments, the pixel shift module 104 can be implemented as a programmable logic array, application specific integrated circuit, system on a chip (SOC), or other similar firmware, as well as by a combination of any number of dedicated or shared processors, flight control computers, navigational equipment pieces, computer-readable storage devices, power supplies, storage devices, interface cards, and other standardized components.

In various embodiments, as depicted in FIG. 1, the pixel shift module 104 may be realized as an enhanced computer system, having one or more processors 5 operationally coupled to computer-readable storage media or memory 7, having stored therein at least one novel firmware or software program (generally, computer-readable instructions that embody an algorithm) for carrying-out the various process tasks, calculations, and control/display functions described herein. The memory 7, may include volatile and nonvolatile storage in read-only memory (ROM), random-access memory (RAM), and keep-alive memory (KAM), for example. KAM is a persistent or non-volatile memory that may be used to store various operating variables while the processor 5 is powered down. The memory 7 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processor 5.

During operation, the pixel shift module 104, and hence the processor 5, may be programmed with and execute at least one firmware or software program (for example, program 9, described in more detail below) that embodies an algorithm for receiving, processing, unpacking, calculating, and constructing, described herein, to thereby perform the various process steps, tasks, calculations, and control/display functions described herein.

Pixel shift module 104 may exchange data, including real-time wireless data, to support operation of the system 102 in embodiments. In this case, the pixel shift module 104 may utilize the communications bus and communications circuit 11. In various embodiments, the communications circuit 11 includes the hardware and software to support one or more communication protocols for wireless communication between the processor 5 and external sources, such as satellites, the cloud, communication towers and ground stations. In various embodiments, the communications circuit 11 supports wireless data exchange over a communications network, such as a public or private network implemented in accordance with Transmission Control Protocol/Internet Protocol architectures or other conventional protocol standards. Encryption and mutual authentication techniques may be applied, as appropriate, to ensure data security. In various embodiments, the communications circuit 11 supports communication with technicians, and/or one or more storage interfaces for direct connection to storage apparatuses. In various embodiments, the communications circuit 11 is integrated within the pixel shift module 104.

With continued reference to FIG. 1, the pixel shift module 104 may be embodied as one or more application modules that may be operating in the system 102. In various embodiments, each module in FIG. 1 represents a processing block of software (e.g., a block within program 9) that is configured to cause the processor 5 to perform the tasks/processes described herein.

In the absence of the present invention, the display system 112 may directly render the initial coherent RGB image frame 115 on the display device 20. However, as introduced above, the present invention converts the initial coherent RGB image frame 115 into an improved image frame, the herein referred to "modified coherent RGB image frame 117 for the CS display" by performing image motion artifact correction on the initial coherent RGB image frame 115, as follows.

A sub-frame (SF) timing rate determiner module 114 converts the frequency of the CS display 20 into a sub-frame timing rate (also referred to herein as display SF timing rate, and SF rate). An unpacking module 116 uses the SF rate to determine the amount of time each sub-frame of the initial coherent RGB frame 115 is being displayed. More specifically, the unpacking module 116 uses the SF timing rate to unpack the initial coherent RGB frame 115 into its separate Red (R) frame, Green (G) frame, and Blue (B) frame, collectively referred to as RGB sub-frames. As may be appreciated, if the frequency of the CS display 20 changes, the SF rate may change. Therefore, the SF rate may be static or dynamic.

A LOS monitor module 118 receives the LOS motion rate, generally measured in degrees per second or radians per second, from the source of motion rate 110. The LOS monitor module 118 utilizes a preprogrammed delay time to compare an initial LOS motion rate to a LOS motion rate at the expiration of the preprogrammed delay time and determine therefrom a LOS rate change. In some embodiments, the LOS monitor module 118 is monitoring a vehicle LOS motion rate; in some embodiments, the LOS monitor module 118 is monitoring a head LOS motion rate; and, in some embodiments, the LOS monitor module 118 is monitoring both the head LOS motion rate and the vehicle LOS motion rate.

In embodiments that monitor both the head LOS motion rate and the vehicle LOS motion rate, the LOS monitor module 118 separately evaluates each LOS motion rate as described above, and then combines the outcome from each to result in one LOS rate change output; i.e., compare an initial head LOS motion rate to a head LOS motion rate at the expiration of the preprogrammed delay time to determine a head LOS rate change; and, compare an initial vehicle LOS motion rate to a vehicle LOS motion rate at the expiration of the preprogrammed delay time to determine a vehicle LOS rate change. In various embodiments, the system 102 combines the head LOS motion rate and the vehicle LOS motion rate by first transforming them to the same coordinate system if they are not already, and then summing their motion rate components. For example, the head motion rate on azimuth is added to the vehicle motion rate on azimuth to achieve a combined motion rate on azimuth. The same method is applied to the other two axes (i.e. elevation and roll). In various embodiments, the system 102 determines a differential IMU rate by subtracting the head LOS motion rate from the vehicle LOS motion rate.

A pixel shift calculator module computes sub-frame pixel offsets or shifts for each individual color sub-frame based on the LOS rate change and a timing schedule of pixels per degree of the CS display 20. In an example, a CS display is characterized by 1920 pixels horizontal×1080 pixels vertical, and the CS display covers 35 degrees horizontally and 20 degrees vertical. The CS display 20 has (1920/35)=54.85 pixels per degree horizontal and 1080/20=53 pixels per degree vertical.

In various embodiments, when sub-frame pixel offsets are determined to be a fractional value, i.e. a subpixel value, the system 102 rounds the SF pixel offset to the nearest whole pixel. In other embodiments, when sub-frame pixel offsets are determined to be a fractional value, i.e. a subpixel value, the system 102 will interpolate/dither across pixel boundaries based on the subpixel fractional value.

The pixel shift calculator module processes the pixels per degree of the CS display 20 with the LOS rate change output generated by the LOS monitor module 118 to calculate a separate Red shift (Rs), Green shift (Gs), and Blue shift (Bs). The pixel shifts, Rs, Gs, and Bs, accommodate for the motion detected and communicated by the sources of motion rate 110.

A pixel shift for a color is equal to a SF time (from a reference color), multiplied by an angular rate of the CS display 20, multiplied by the pixels per degree of the CS display 20. The angular rate of the CS display is a function of the display frequency, which is the frequency that it cycles between the color frames (e.g., R-G-B-R-G-B . . . ). The pixel shift calculation is expressed in Equation 1, below.

$$\text{Pixel shift}=\text{SF time}*\text{angular rate}*\text{pixels/degree} \qquad \text{Eq. 1}$$

A constructor module 122 receives the RGB sub-frames and the Rs, Gs, and B s from the pixel shift calculator 120. The constructor module 122 constructs a modified sub-frame for each of the R,G,B frames received, by applying the red pixel shift (Rs) to the red frame, the green pixel shift (Gs) to the green frame, and the blue pixel shift (Bs) to the blue frame, these modified sub-frames collectively referred to as modified RGB sub-frames. The constructor module 122 also performs a re-packing operation, in which it re-packs the modified RGB sub-frames into a modified coherent RGB image frame 117 for the CS display. The resultant modified coherent RGB image frame 117 for the CS display provides image motion artifact correction.

The resultant modified coherent RGB image frame 117 for the CS display provides image motion artifact correction because the modified RGB sub-frames take into account the scene movement due to the processing of the motion rate input, as a result, the modified RGB sub-frames, when re-packed and rendered on the CS display 20, will align properly on the retina of eye, eliminating color rainbowing and retina blur artifacts due to vehicle or head motion. This solution has been proven to work well in applications using head-tracked camera imagery as well as in applications using head-tracked synthetic imagery.

Turning now to FIG. 2, and with continued reference to FIG. 1, a flowchart of a method 200 for calibrating a synthetic image on an avionic display in a cockpit of an aircraft is described, in accordance with exemplary embodiments of the present disclosure. For illustrative purposes, the following description of method 200 may refer to elements mentioned above in connection with FIG. 1. In practice, portions of method 200 may be performed by different components of the described system. It should be appreciated that method 200 may include any number of additional or alternative tasks, the tasks shown in FIG. 2 need not be performed in the illustrated order, and method 200 may be incorporated into a more comprehensive procedure or method having additional functionality not described in detail herein. Moreover, one or more of the tasks shown in FIG. 2 could be omitted from an embodiment of the method 200 as long as the intended overall functionality remains intact.

Prior to operation, the system 102 is understood to be configured and operational for position-determining operations, movement-determining operations, and generating a vehicle or avionic display for a user to view on the CS display 20 of the display system 112.

At 202, the system 102 receives an initial coherent RGB frame 115 from the source of frame 108. At 204, the system 102 calculates the SF timing rate based on the frequency of the CS display 20, as described above. At 206, the system 102 begins an unpacking operation, in which it unpacks the initial coherent RGB image frame 115 into a separate Red frame, Green frame, and Blue frame.

At 208, a LOS monitoring module may receive one or more motion rates and generates therefrom a LOS rate of change. At 210, the system 102 computes a Red pixel shift, a Green pixel shift, and a Blue pixel shift (Rs, Gs, Bs), that reflects the LOS rate of change. At 212, a modified sub-frame for each of the R,G,B frames is constructed by applying the red pixel shift (Rs) to the red frame, the green pixel shift (Gs) to the green frame, and the blue pixel shift (B s) to the blue frame; the resulting modified sub-frames are collectively referred to as modified RGB sub-frames. At 214, the system 102 re-packs the modified RGB sub-frames into a modified coherent RGB image frame 117 for rendering on the CS display 20. After 214, the method may end, or return to 202.

Accordingly, the present disclosure has provided several embodiments of systems and methods for providing image motion artifact correction for a color sequential (CS) display in a display system in a vehicle. The disclosed pixel shift module 104 operates on an initial coherent RGB image frame for a CS display, converting the initial coherent RGB image frame 115 into a modified coherent RGB image frame 117, in which the respective RGB sub-frames, when displayed by the CS display, are coherent and aligned—on the eye retina—even in the presence of the temporal shifting of the RGB sub-frames introduced via the sequential nature of the CS display 20. Therefore, in addition to the technical solution provided, the present disclosure provides an objectively improved HMI over available vehicle display systems.

Although an exemplary embodiment of the present disclosure has been described above in the context of a fully-functioning computer system (e.g., system 102 described above in conjunction with FIG. 1), those skilled in the art will recognize that the mechanisms of the present disclosure are capable of being distributed as a program product (e.g., an Internet-disseminated program 9 or software application) and, further, that the present teachings apply to the program product regardless of the particular type of computer-readable media (e.g., hard drive, memory card, optical disc, etc.) employed to carry-out its distribution.

Terms such as "comprise," "include," "have," and variations thereof are utilized herein to denote non-exclusive inclusions. Such terms may thus be utilized in describing processes, articles, apparatuses, and the like that include one or more named steps or elements but may further include additional unnamed steps or elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A processor-implemented method for providing image motion artifact correction for a color sequential (CS) display in a display system in a vehicle, the method comprising:
   receiving a coherent red green blue (RGB) image frame for the CS display;
   calculating a sub-frame timing rate as a function of a CS display frequency of the CS display;
   unpacking the coherent RGB image frame into a red frame, a green frame, and a blue frame, based on the sub-frame timing rate;
   monitoring a Line of Sight (LOS) motion rate generated by a source of the LOS motion rate;
   determining a line of sight (LOS) rate change as a function of the LOS motion rate;
   calculate a red pixel shift, a green pixel shift, and a blue pixel shift, collectively referred to as sub-frame pixel shifts, wherein each of the sub-frame pixel shifts is a function of the LOS rate change, the sub-frame timing rate, and a pixels per degree of the CS display;
   constructing modified RGB sub-frames, by applying the red pixel shift to the red frame, the green pixel shift to the green frame, and the blue pixel shift to the blue frame; and
   re-packing the modified RGB sub-frames into a modified coherent RGB image frame for the CS display, thereby providing the image motion artifact correction,
   wherein a display sub-frame timing includes a reference time for a first color, a second color offset time for a second color, and a third color offset time for a third color; and
   wherein the method further comprises:
      calculating the sub-frame pixel shifts further as a function of a number of pixels per degree horizontally on the CS display and a number of pixels per degree vertically on the CS display;
      calculating the sub-frame pixel shifts horizontally as a function of the number of pixels per degree horizontally, a horizontal angular rate of the CS display, and the display sub-frame timing; and
      calculating the sub-frame pixel shifts vertically as a function of the number of pixels per degree vertically, a vertical angular rate of the CS display, and the display sub-frame timing.

2. The method of claim 1, wherein the LOS motion rate is a head motion rate or a vehicle motion rate.

3. The method of claim 1, wherein the LOS motion rate is a vehicle motion rate and further comprising:
   monitoring a head motion rate; and
   determining the LOS rate change as a function of the head motion rate and the vehicle motion rate.

4. The method of claim 3, wherein the head motion rate is received from an inertial motion unit (IMU) on a user's head.

5. The method of claim 3, wherein the vehicle motion rate is received from an inertial motion unit (IMU) on the vehicle.

6. The method of claim 1, wherein the reference time is time zero, the second color offset time is X milliseconds, the third color offset time is Y milliseconds; and
   wherein, the first color, the second color, and the third color together comprise a combination of red, green, and blue.

7. A system providing image motion artifact correction for a color sequential (CS) display in a display system in a vehicle, the system comprising:

a source of a coherent red green blue (RGB) image frame for the CS display;

a source of a Line of Sight (LOS) motion rate;

a processor operationally coupled to the source of the coherent RGB image frame, the source of the motion rate, and the display system, the processor configured by programming instructions to, receive the coherent RGB image frame;

calculate a sub-frame (SF) timing rate for the CS display;

unpack the coherent RGB image frame into a Red (R) frame, Green (G) frame, and a Blue (B) frame, based on the SF timing rate;

monitor the LOS motion rate;

determine a LOS rate change as a function of the LOS motion rate;

calculate a red pixel shift, a green pixel shift, and a blue pixel shift, collectively referred to as sub-frame pixel shifts, wherein each of the sub-frame pixel shifts is a function of the LOS rate change, the SF timing rate, and a pixels per degree of the CS display;

construct modified RGB sub-frames, by applying the red pixel shift to the Red frame, the green pixel shift to the Green frame, and the blue pixel shift to the Blue frame; and re-packing the modified RGB sub-frames into a modified coherent RGB image frame for the CS display, thereby providing the image motion artifact correction, wherein a display sub-frame timing includes a reference time for a first color, a second color offset time for a second color, and a third color offset time for a third color; and wherein the processor is further programmed to:
calculate the sub-frame pixel shifts further as a function of a number of pixels per degree horizontally on the CS display and a number of pixels per degree vertically on the CS display;
calculate the sub-frame pixel shifts horizontally as a function of the number of pixels per degree horizontally, a horizontal angular rate of the CS display, and the display sub-frame timing; and
calculate the sub-frame pixel shifts vertically as a function of the number of pixels per degree vertically, a vertical angular rate of the CS display, and the display sub-frame timing.

8. The system of claim 7, wherein the LOS motion rate is a head motion rate or a vehicle motion rate.

9. The system of claim 7, wherein the LOS motion rate is a vehicle motion rate and wherein the processor is further programmed to:
monitor a head motion rate; and
determine the LOS rate change as a function of the head motion rate and the vehicle motion rate.

10. The system of claim 9, wherein the processor is further programmed to receive the head motion rate from an inertial motion unit (IMU) on a user's head.

11. The system of claim 9, wherein the processor is further programmed to receive the vehicle motion rate from an inertial motion unit (IMU) on the vehicle.

12. The system of claim 7, wherein the reference time is time zero, the second color offset time is X milliseconds, the third color offset time is Y milliseconds; and
wherein, the first color, the second color, and the third color together comprise a combination of red, green, and blue.

* * * * *